Aug. 31, 1948.                R. S. SHREWSBURY                2,448,473
                         COMPENSATING MEANS FOR INDICATORS
                              ON POSITIONING DEVICES
Filed May 17, 1946                                    3 Sheets-Sheet 1
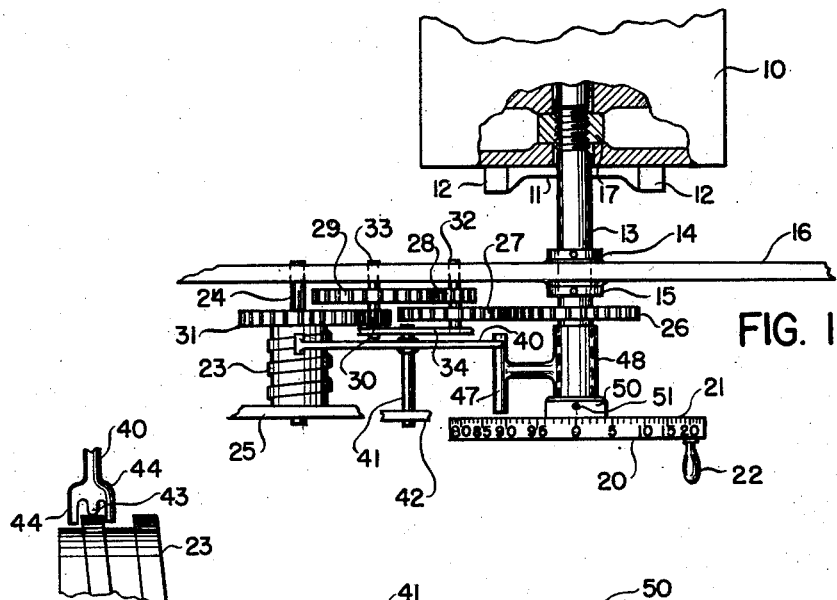
FIG. 1
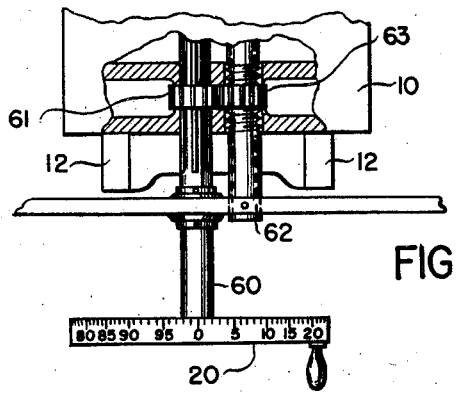
FIG. 3
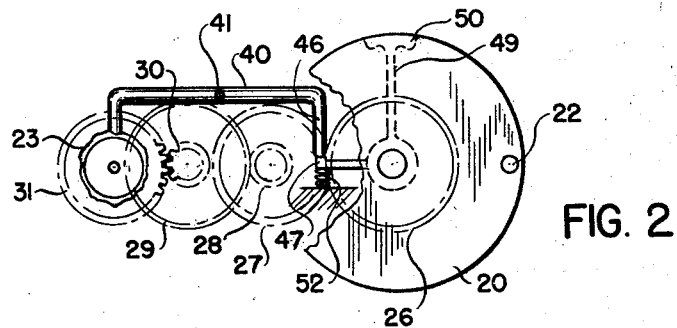
FIG. 2
FIG. 4
INVENTOR
Robert S. Shrewsbury
BY
Watson, Bristol, Johnson & Leavenworth
ATTORNEYS Aug. 31, 1948.    R. S. SHREWSBURY    2,448,473
COMPENSATING MEANS FOR INDICATORS
ON POSITIONING DEVICES Filed May 17, 1946    3 Sheets-Sheet 2

INVENTOR
Robert S. Shrewsbury
BY
Watson, Bristol, Johnson & Leavenworth
ATTORNEYS Aug. 31, 1948.                    R. S. SHREWSBURY                    2,448,473
                           COMPENSATING MEANS FOR INDICATORS
                                 ON POSITIONING DEVICES
Filed May 17, 1946                                                    3 Sheets-Sheet 3

INVENTOR
Robert S. Shrewsbury.
BY
Watson, Bristol, Johnson & Leavenworth
ATTORNEYS Patented Aug. 31, 1948

2,448,473

UNITED STATES PATENT OFFICE 2,448,473

COMPENSATING MEANS FOR INDICATORS ON POSITIONING DEVICES

Robert Sidney Shrewsbury, Dunedin, Fla.

Application May 17, 1946, Serial No. 670,637

13 Claims. (Cl. 116—124)

The invention is concerned with the provision of mechanism for compensating for the errors which unavoidably occur in positioning devices employing lead screws or like devices such as are ordinarily employed for adjusting the position of an element relative to its support. Such adjustments are normally required in milling machines, comparators, jig borers, dividing machines and the like.

As an example, a common mechanism for adjusting a table or like element is by means of a long screw and cooperating nut, one of which is rotatable relative to the other, to produce a relative translatory motion which is employed to position the table or other element. Even with careful precise manufacturing methods and machines with close tolerances, it is practically impossible to produce a lead screw which is completely accurate throughout its length. That is, it will be found in use that the adjusted positions do not correspond exactly at many points with the position mathematically called for by a given relative rotation between an accurate screw and its nut having a given pitch. The same is true as between a worm and a meshing worm gear. An indicator which progressively derives its position from such rotation will not, therefore, represent throughout its range the true positions of the movable table or corresponding element.

It is an object of the present invention to compensate for such errors or departures. In accordance with the principles thereof, the compensation is effected from an adjustable cam which has been generated with a contour embodying progressively a correcting factor of a character and in proportion to the departure. The cam may be operated in timed relation with the advance of the adjustable table or other element and the compensation accordingly effected continuously and progressively by automatically operating means.

The mechanism embodies an indicator mechanism which is so associated that motion derived from the cam means is applied to the indicator mechanism to effect an appropriate adjustment, whereby a reading of the true position of the table is presented constantly throughout its range of movement.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a plan view, largely diagrammatic, of of a lead screw operated mechanism embodying the principles of the invention;

Fig. 2 is an end elevational view of the mechanism of Fig. 1;

Fig. 3 is a fragmentary view of the compensating cam and follower of Figs. 1 and 2;

Fig. 4 is a partial view of mechanism similar in general to that of Fig. 1, but embodying a somewhat different arrangement of lead screw means;

Figure 7:
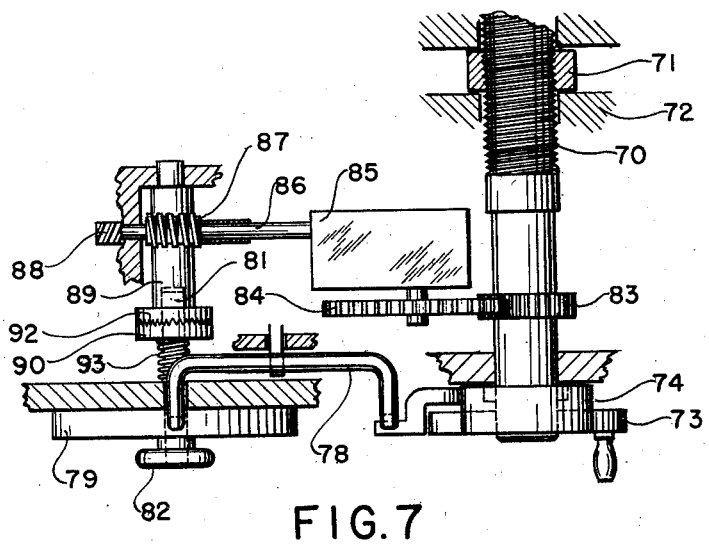
Fig. 7 is a plan view of the mechanism shown in Fig. 6.

The mechanism, in general, of Fig. 1 includes a translatable element such as a table 10 mounted on suitable supporting frame 11 including guide means such as the ways 12. The table 10 is adapted to be translated by the lead screw 13, which is mounted to rotate but restrained against axial movement by means of the collars 14 and 15 secured thereon and cooperating with the bearing for the screw in frame part 16. The table carries an internally threaded nut 17 secured against rotation or movement relative to the table 10, whereby rotation of the lead screw 13 causes the table to be advanced along its supporting ways 12. The outer end of the lead screw has secured thereon a circular plate 20, which is provided with a peripheral graduated dial 21 for a purpose soon to be described. Rotation of the lead screw 13 may be effected in any suitable manner, as by means of the hand grip 22 secured to the plate 20. Associated with the mechanism thus far described is a cylindrical drum provided with a helical cam 23 mounted for rotation in fixed frame parts as, for example, by means of a shaft 24 on which the helical cam 23 is secured, the shaft being provided with a bearing in the frame plate 16 and a bearing at the opposite end in an auxiliary frame part shown fragmentarily at 25.

The helical cam 23 is connected to be rotated in timed relation with the lead screw 13, and its total peripheral length is representative of the length of the lead screw, although the ratio between the two may be varied to suit conditions. As here shown, a reduction drive is employed and accordingly the helical cam 23 rotates at a reduced speed relative to the rotation of the lead screw 13. The specific reduction illustrated consists of a series of spur gears 26, 27, 28, 29, 30 and 31, gear 26 being secured on the lead screw shaft 13 and gear 31 on the cam shaft 24, the intervening gears 27 and 28 being secured to a common shaft 32 and the gears 29 and 30 to a shaft 33. The intervening gear shafts may be supported in any suitable bearing means, such as may be provided in the frame plate 16 and an auxiliary plate shown partially at 34.

In constructing the device, the lead screw 13 is initially tested and analyzed for departures from a precisely uniform degree of thread lead along its length, and the helical cam 23 is then generated with suitable hills and valleys in the peripheral surface so that the contour represents progressively the variations from a true screw exhibited by the lead screw 13. This will be made more clear shortly in connection with a description of how the compensating means operates. For the moment it is noted that there is provided an inverted U-shaped lever 40 pivoted intermediate its ends on a shaft 41 and adapted to receive both a rocking and sliding movement with respect to the shaft 41 which is mounted in fixed position in suitable supporting means, such as the frame parts 34 and 42. The lower end at the left of the lever 40 is provided with a cam follower including a rounded projection 43 adapted to ride on the peripheral surface of the helical cam 23, and with a pair of downwardly extending spaced ears 44 which straddle the sides of the cam 23 whereby, upon rotation of the cam 23, the lever 40 is caused to slide along the rod 41 maintaining the follower point 43 progressively in engagement with the peripheral surface of the helix. The intervening gearing is so arranged that cam 23 rotates in a direction opposite to plate 20.

The opposite end of lever 40 has a downwardly extending finger 46 provided with a rounded point adapted to ride along the upper surface of a bar 47. The bar 47 is integral with a sleeve 48 mounted freely on the lead screw 13 for oscillation thereon. The sleeve 48 also has an upwardly extending flange 49, at the outer end of which is located an arc-shaped segment 50 provided with a zero marker 51 adapted to be moved adjacent the dial indicia 21 of the plate 20. Suitable means are provided for maintaining the follower 43 in contact with the helix 23 which, in the present case, is indicated as a compression spring 52 engaging between a fixed support and the under surface of the bar 47. It will be apparent that, as the helix 23 is rotated, the lever 40 will be oscillated back and forth which, in turn, will cause the arc-shaped segment 50 to be oscillated relative to the plate 20 and its indicia 21.

An example of the manner in which the mechanism serves to compensate for errors of the lead screw will now be given. It may be assumed that the lead screw is of single thread provided with ten turns per inch, which means that each rotation of the plate 20 and the lead screw will advance the nut 17 and its table .100 inch. Assume further that the dial plate 20 has a circumference of 10 inches. The dial is graduated numerically from 1 to 100, and the peripheral distance between graduation marks is .100 inch, but this distance corresponds to an advance of the nut 17 of .001 inch. In other words, the dial is graduated in terms of thousandths of an inch lateral advance of the lead screw nut. Assume now that it is desired to advance the table 10 upwardly, in Fig. 1, a distance of .100 inch. If the lead screw is precisely accurate, this requires one complete counter-clockwise rotation of the plate 20 and lead screw. If, however, it had been found by previous analysis of the screw that it contains an error at this region such that it advances the nut .099 inch instead of .100 inch, the cam 23 will have been so constructed as to move the pointer 51 counter-clockwise, in Fig. 2, at this position of the nut, a distance equal to one of the spaces on the dial 20. Accordingly, when the 0 graduation on plate 20 arrives opposite the pointer 51, the table will have been advanced the desired .100 inch although the plate 20 will actually have been rotated one graduation space more than a complete revolution. In other words, the mechanism will have automatically corrected itself for an error of .001 inch, and the nut 17 and its table will have been advanced .100 inch in accordance with the reading at the dial 20. Appropriate compensation will occur progressively as the table is further fed upwardly, in Fig. 1, by continued counter-clockwise rotation of the dial 20, and the follower 43 progresses in timed relation along the helix 23. At some point in the travel, for example, the lead screw error may be the converse of the one described, so that the nut is over-advanced, for example, .002 inch with respect to an uncorrected numeral indication at the dial 20. At this point, however, the helix 23 will be provided with a depression so that the pointer 51 will occupy a position two spaces to the right in Fig. 1, and the net result is that the pointer 51 will correctly indicate on dial 20 the true position of the nut 17 and its table 10. The proper correction automatically occurs in either direction of rotation of the screw.

It will be understood that the arrangement shown in Figs. 1 to 3 is more or less indicative of the principle of the device, and many variations in structure may be employed within the illustrated principle. For example, the lead screw may be fixed and its cooperating nut made rotary. Such a modification is shown in Fig. 4, in which the dial member 20 is secured on a shaft 60, the shaft being rotatable but fixed against endwise movement in suitable supports in the frame. Splined on the shaft 60 is a gear 61 adapted to move along the shaft 60 with the table 10. The lead screw 62 is restrained from rotation or end movement in the frame and has mounted thereon a gear 63 internally threaded to receive the lead screw and meshing externally with the gear 61, both gears being held against endwise movement, whereby rotation of shaft 60 and, through gear 61, of gear 63 causes translation of the table 10 along its ways 12. The remaining structure comprising the compensating means may be associated with the shaft 60 and the dial 20 in the same manner that such mechanism is associated with the lead screw 13 and the dial 20 of Figs. 1 to 3. Or the compensating mechanism may be more in the nature of that shown in connection with Figs. 5 and 6 now to be described.

Figure 6:
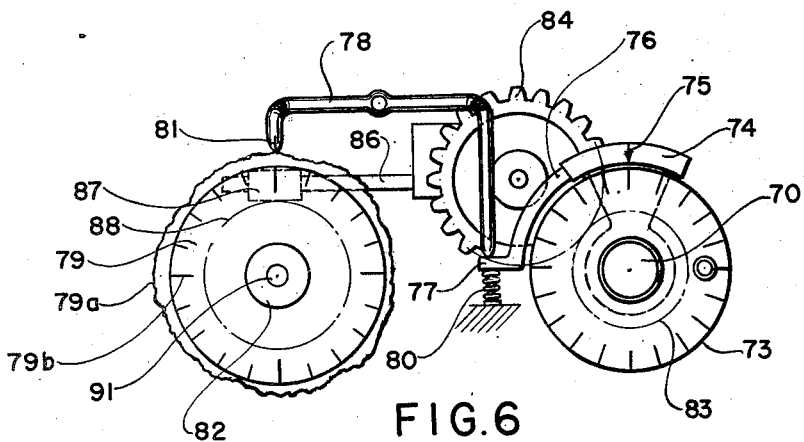
Fig. 6 is a view similar to that of Fig. 5 but designed for automatic operation.
Figure 5:
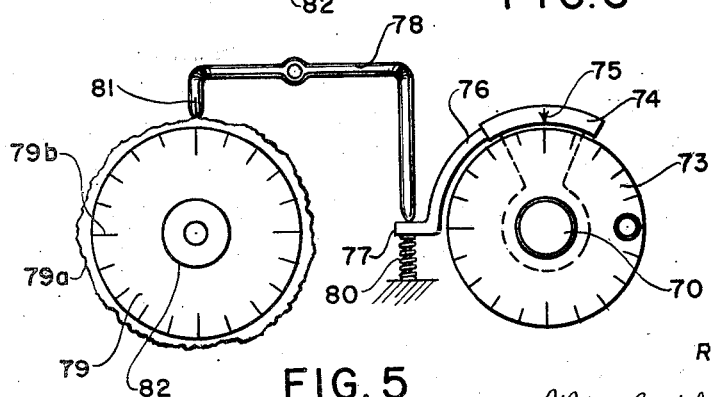
Fig. 5 is an end elevation of a modified form employing a disc cam means for compensating for lead screw errors.

The compensating means of Figs. 6 and 7 is similar, in general, to that of Figs. 1 to 3, but employs a single disc cam in place of the helical cam of the former figures. The mechanism of Fig. 5 is similar to that of Figs. 6 and 7 except that it omits the automatic means for adjusting the compensating cam, the cam being adapted to be set manually to a position corresponding to that to which the table has been adjusted by rotation of the lead screw. In both forms the lead screw 70 corresponds to the lead screw 13 of Fig. 1 and similarly cooperates with a nut 71 fixed in a table or other element 72 to be translated or adjusted, shown fragmentarily in Fig. 7.

Secured on the outer end of the lead screw is a disc 73 provided with a suitable dial and indicia and having cooperating therewith a segment 74 provided with a suitable marker 75. The segment is mounted to oscillate on the lead screw shaft and is provided with an arc-shaped bracket 76 which has a radial finger 77 upon which rides one finger of the inverted U-shaped lever 78, the other downwardly extending finger of which is adapted to ride on the peripheral surface of the rotatably mounted disc 79 provided with a peripheral cam surface 79a. The lever is held in contact with the cam by any suitable means, such as by a spring 80 which functions similarly to spring 52 of Fig. 2.

The peripheral cam surface 79a is generated to represent progressively the length of the lead screw thread and to compensate for errors at the respective points. The face of disc 79 is suitably graduated, as indicated at 79b, to correspond with the lead screw, and the follower finger has a cooperating index marker 81.

In the operation of the form of Fig. 5, the cam is rotated manually by means of hand knob 82 to a position corresponding to the desired position of the table as effected by rotation of the lead screw. The cam positions the segment 74, whereby the marker 75 thereon provides a proper base reference for the dial on disc 73 and proper angular setting of the lead screw.

In the automatically operated cam means of Figs. 6 and 7, the lead screw 70 carries thereon a spur gear 83 connected through a suitable drive means to rotate the disc cam 79 at a considerably reduced rate. The drive means for the cam disc 79 is indicated in a largely diagrammatic manner and includes a gear 84 meshing with the gear 83 and driving through an intermediate reduction gear mechanism, shown diagrammatically at 85, a rotary shaft 86 which carries a worm 87 meshing with worm gear 88 mounted on shaft 89.

For convenience in making the initial set-up of the mechanism of Figs. 6 and 7, or that of Figs. 1 to 3, it may be desirable to provide an intermediate disengageable means whereby the cam means can be initially set in the proper relation to the position of the lead screw, and the drive then connected. In Fig. 7 this is shown in the form of a clutch, one jaw 90 of which is secured to shaft 91, to which cam 79 is also secured, and the opposite jaw 92 being secured to shaft 89. The end of shaft 91 has a rotatable and slidable bearing fit in an axial opening in the outer end of shaft 89. For setting cam 79, it is pulled outwardly against spring 93 by means of hand knob 82 and, after angular adjustment to the correct position, released for re-engagement of the clutch members. The functioning is the same as in the mechanism of Figs. 1 to 3, except that since in Figs. 6 and 7 the cam is a single flat disc there is no requirement for the follower to translate laterally.

Figure 8:
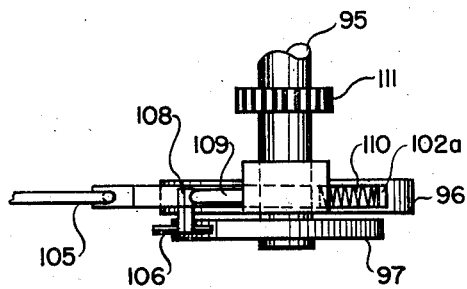
Fig. 8 is a fragmentary plan view of mechanism such as that shown in Figs. 6 and 7 but embodying an auxiliary cam for compensating for periodically recurring errors in a lead screw.
Figure 9:
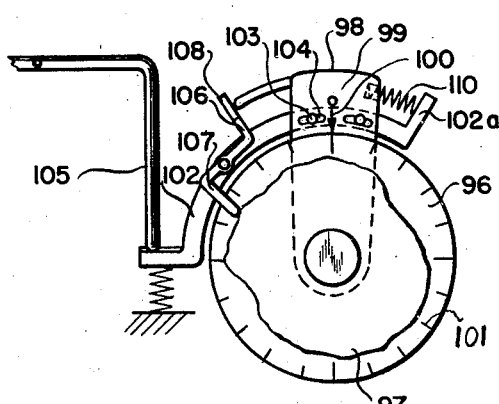
Fig. 9 is an elevation or end view of the mechanism shown in Fig. 8.

The device of Figs. 8 and 9 is adapted to be embodied in a compensating mechanism, such as that shown in Figs. 5 to 7, but includes an additional cam means for compensating for errors which recure periodically in each revolution of a lead screw due to such factors as drunken threads, faulty bearings and similar defects. Where such defects are present and of substantial consequence, a cam means such as that shown at 79 in Figs. 5 to 7 would require an excessive amount of plotting and variation, and accordingly these similar errors which occur in each revolution of the shaft are corrected independently in the mechanism of Figs. 8 and 9 by a cam which is mounted on the lead screw shaft and rotates at the same angular speed.

Referring more specifically to the details, the shaft 95 corresponds to the lead screw 70 in Fig. 7. Mounted on the outer end is a graduated dial 96 and also a cam 97. The cam 97 is provided with a peripheral contour adapted to compensate for the periodic errors recurring in each revolution of the lead screw shaft 95. Associated with the dial 96 is an oscillatable index member 98 having a hub portion supported on the shaft 95 and an upper portion 99 which extends over the periphery of the dial 96 and has thereon a zero index mark 100 associated with the index marks 101 on the dial 96. An arc-shaped bar 102 is supported in the head portion 99 of the oscillatable member 98 and is free to slide therein for a limited angular distance as permitted by the set screws 103 secured in the bar 102 adapted to move in the arcuate slots 104 in the head 99. The bar 102 corresponds, in general, to the bar 76 of Figs. 5 to 7, and the lever 105 corresponds to the lever 78 of the previous figures and is adapted to be operated by a similar cam means and drive therefor as shown in Figs. 6 and 7.

Pivoted on the bar 102 is a lever 106 having a finger 107 engageable with the periphery of the cam 97, the other extreme end of the lever 106 having a bearing portion 108 adapted to engage against a finger 109 integral with the head portion 99 of the index member 98. The bar 102 is provided at its right end with an upstanding finger 102a, and mounted between this finger and the head 99 is a compression spring 110. The lead screw is adapted to be rotated in any suitable manner as, for example, through the gear 111 secured thereon, which gear may also serve to drive the non-periodic cam compensating means as shown in Figs. 6 and 7.

It will be seen that the position of the index head 99 is dependent upon the effect of both cam 97 and the cam 79 as shown in Figs. 6 and 7. The cam 97 is first laid out to represent the periodic errors or departures occurring in each revolution of the lead screw 95, and thereafter the cam 79 is laid out and formed to represent the non-periodic errors which exist in the lead screw from one end to the other. In operation, the cam 97, operating through the lever 106, shifts the index head 99 to corresponding positions and simultaneously the cam 79, operating through the lever 105, may likewise shift the head 99. The movements effected from the two cams may be in the same direction or in an opposite or offsetting direction, the spring 110 serving at all times to maintain the end of finger 109 against the bar 108 of the lever 106.

Figure 10:
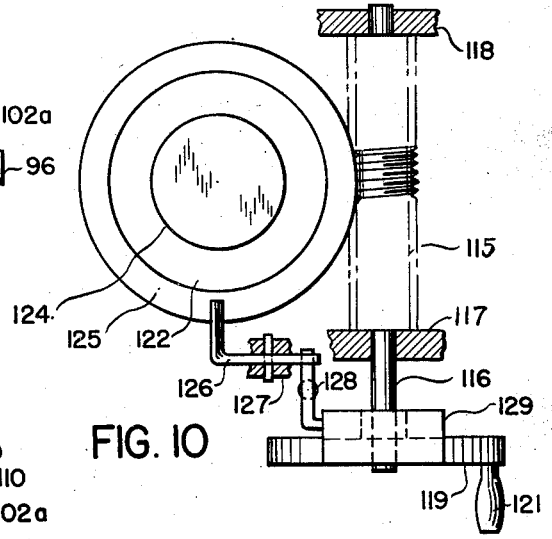
Fig. 10 is a plan view of a compensating means for a rotary screw and gear such as that employed in a divider head.
Figure 11:
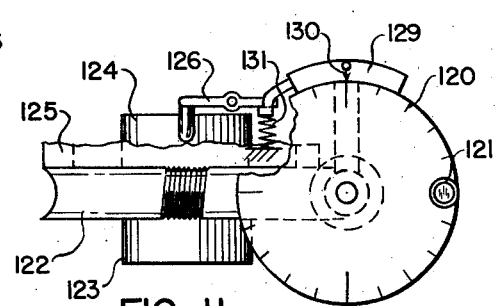
Fig. 11 is an elevation or end view of the mechanism of Fig. 10.

The mechanism of Figs. 10 and 11 is representative of a combined screw or worm operating on a worm gear to position angularly an element such as is embodied in a conventional divider head. As shown in these figures, the elements include a worm or screw 115 mounted on a shaft 116 supported in fixed bearings such as those shown at 117 and 118. The outer end of shaft 116 has secured thereon a disc 119 having a dial 120 and may be provided with a handle 121 for rotation of the dial and worm 115. A worm gear 122 is supported in journals such as those indicated generally at 123 and 124 and has gear teeth meshing with those of the worm 115. Secured to one side surface of gear 122 is an annular cam 125. A lever 126 pivoted in fixed bearings 127 has a finger at one end engaging with the cam 125, the other end of the lever engaging over a finger 128 secured to the index head 129 which is mounted on and adapted to oscillate on the shaft 116. The index member 129 has an upper portion overlying the peripheral surface of the disc 119 and is provided with an index mark 130 cooperating with the dial marks 120 of the disc 119. A spring 131 serves to maintain the lever 126 in engagement with the cam 125 in a manner similar to that described in connection with the mechanism of previous figures.

The manner of compensating for errors is similar to that of the device of Figs. 1 to 3, and 5 to 7. In general, the cam 125 is designed to correct for departures from the true theoretical angular position of the gear 124 and any mechanism connected thereto resulting from errors in the teeth on the gear 122 and the cooperating threads of the worm 115 and like factors.

Figure 12:
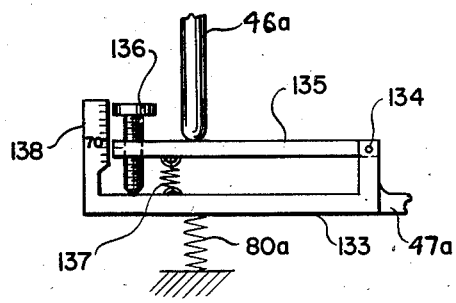
Fig. 12 is a fragmentary view of a device for compensating for variations in temperature adapted to be embodied in the various mechanisms of the preceding figures.

Fig. 12 shows a device adapted to be embodied in any of the mechanisms of the preceding figures to compensate additionally for variations in temperature. The device there shown is adapted to constitute as a whole a bearing plate corresponding to that shown at 47 in Figs. 1 to 3, for example, and accordingly it is supported on an arc-shaped bar, shown fragmentarily at 47a, corresponding to the bar 47 of Figs. 1 to 3, and has a lever 46a engaging on the upper surface of the device corresponding to the lever 46 of Figs. 1 to 3, and also has a spring 80a serving to urge the device bodily in a clockwise direction and maintain it in engagement with the lower end of the lever 46a. The device includes a base 133 having pivoted at 134 thereon an upper bar 135 with which the lever 46a contacts. The free end of bar 135 is provided with a set screw 136 for adjusting its position, the lower end of the screw being held in contact with the lower bar 133 by a tension spring 137. The left end of the bar 133 is provided with an upstanding plate 138 graduated in terms of temperature.

In the application of the device, the errors of a lead screw are determined at a given known temperature and plotted and the cam laid out for such temperature. In the use of the assembled mechanism, when the lead screw is at some materially different temperature, as is often the case, the originally prepared cam contour will no longer be precisely correct, but may be made substantially so by adjustment of the set screw 136, which shifts the base setting of the index member such as that shown at 50 in Figs. 1 to 3.

Although the device of Fig. 12 is specifically described as applied to the mechanism of Figs. 1 to 3, it is apparent that it may also be incorporated in any one of the various other arrangements. As employed in the device of Figs. 1 to 3, the plate 135 would, of course, have a substantial width perpendicular to the paper in Fig. 12 corresponding in general to the dimensions of the bar 47 in Fig. 1 to 3 to permit travel therealong of the pivoted lever 46a.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A mechanism for compensating for errors in a postioning device embodying a member rotatable with respect to another member and a screw connection between said members for effecting adjustment of one thereof by such relative rotation, means for producing such relative rotation, an indicator connected to said means, a cam and cam follower connected to be operated in timed relation with said means for producing relative rotation between said members, said cam being shaped to impart a movement to said follower corresponding to departures from an accurate thread in said screw connection, and a connection from said follower to said indicator progressively and continuously operable in all adjusted positions of said members to apply an adjustment to the indicator in accordance with the position of said follower and thereby to compensate for said departures from an accurate thread.

2. Mechanism for compensating for errors in a positioning device embodying a member rotatable with respect to another member to effect progressively an adjustment of the position of one of said members, means for producing said rotation, cam means connected to be moved in timed relation with said rotation, said cam means being formed with a contour representing progressively and in uniform ratio departures from the successive theoretical adjusted positions of said latter member as affected by said rotation, an indicator continuously connected to derive its position progressively from said cam means in all positions of said adjustable member, and means for associating the position of said indicator with said means for producing rotation to present thereto an appropriate correction as needed to compensate for errors.

3. A mechanism for compensating for errors in a lead screw comprising a nut threaded on said lead screw, means for producing relative rotation between said nut and screw to translate one with respect to the other, a cam means connected to be operated in timed relation with said relative rotation, a cam follower, said cam means having a surface for said follower generated to represent progressively the departures from an accurate thread along the length of said screw whereby said follower occupies a position representative of and in proportion to any such departure in the lead screw at the corresponding nut position, and means for associating the postion of said cam follower means with said means for producing relative movement to present an appropriate correction where needed for the respective effective positions of said nut.

4. A mechanism for compensating for errors in a lead screw comprising a nut cooperating with said lead screw, means for producing relative rotation between said nut and screw, a cam means connected to be operated in timed relation with said relative rotation, said cam means being formed to represent progressively departures from an accurate thread on said lead screw, an element connected to derive its position from said cam means, a first indicator member connected to be advanced in timed relation with said relative rotation, and a second indicator member associated therewith connected to be adjusted progressively as to position by said element, said cam means and indicators being arranged and adapted to present constantly an appropriate correction for the successive said departures.

5. In a positioning device, a screw, an element having an operative connection with said screw, means for producing relative rotation between said element and screw to produce thereby a progressive adjustment in the position of said element, a cam means connected to be operated in timed relation with said relative rotation, said cam means being formed to represent progressively departures from an accurate thread in said screw connection, a cam follower means connected to derive its position from said cam means, a first indicator member connected to rotate in timed relation with said means for producing relative rotation, and a second indicator member mounted adjacent said first member and connected to be angularly adjusted by said cam follower means and adapted thereby to indicate the appropriate correction in accordance with the position of said nut along the length of said lead screw.

6. A mechanism for compensating for errors in a lead screw comprising a nut cooperating with said lead screw, means for producing relative rotation between said nut and screw, a cam means connected to be operated in timed relation with said relative rotation, said cam means being formed to represent progressively departures from an accurate thread along said lead screw a cam follower means connected to derive its position from said cam means, a first indicator member connected to rotate in timed relation with said means for producing relative rotation, and a second indicator member mounted adjacent said first member and connected to be angularly adjusted with respect thereto by said cam follower means, one of said members being provided with a graduated dial and the other with a cooperating marker and adapted thereby to indicate on said dial the true position of said nut along the length of said lead screw corrected for any error in the lead screw at the corresponding point thereon.

7. A mechanism for compensating for errors in a lead screw comprising a nut cooperating with said lead screw, means for producing relative rotation between said nut and screw, a rotary cam connected to be rotated in timed relation with said relative rotation, a pivoted lever including a cam follower connected to derive its position from said cam, said cam being provided with a contour for said follower representing progressively and in uniform ratio departures from an accurate thead along said lead screw, a first indicator member connected to rotate in timed relation with said means for producing relative rotation, and a second indicator member mounted adjacent said first member and connected to be angularly adjusted with respect thereto by said cam follower means, one of said members being provided with a graduated dial and the other with a cooperating marker and adapted thereby to indicate on said dial the true position of said nut along the length of said lead screw corrected in the successive positions for errors in the lead screw at the corresponding points thereon.

8. A mechanism for compensating for errors in a lead screw comprising a nut cooperating with said lead screw, a rotary shaft and means for rotating it connected to effect relative rotation between said lead screw and nut, a rotary cam connected to be rotated in timed relation with said shaft, a cam follower therefor, said cam being provided with a contour for said follower representing progressively and in uniform ratio departures from an accurate thread along said lead screw, a first indicator member mounted to rotate with said shaft, and a second indicator member mounted adjacent said first member and connected to be angularly adjusted in accordance with the position of said cam follower, one of said members being provided with graduations and the other with a complementary marker, the arrangement and proportioning being such that said indicators show the true position of said nut along said lead screw corrected in the successive positions for errors in the lead screw at the corresponding points thereon.

9. In a positioning device embodying a screw and means for rotating it and a gear connected to be angularly adjusted thereby, means for compensating for errors in the position of said gear from the theoretically true position comprising a cam connected to be rotated in timed relation with said gear, a cam follower, an indicator means associated with said means for rotating said screw connected to derive its position from said cam follower, said cam being formed with a contour representing progressively and in uniform ratio said errors and adapted thereby to apply continuously in all adjusted positions of said gear an appropriate correction factor to said indicator.

10. In a positioning mechanism embodying a lead screw and nut and means for producing relative rotation to effect a relative translation therebetween, means for compensating for errors in said lead screw comprising a rotary cam provided with a contour representing progressively the substantially like departures from the operation of a true thread periodically recurring in each revolution of the lead screw thread, means for rotating said cam at an angular speed corresponding to the relative rotation between said nut and screw, an adjustably mounted element connected to derive its position progressively from said cam in its rotation, an indicator means associated with said means for effecting relative translation, and a connection from said element for applying a variable adjustment to said indicator means correcting for errors in said lead screw.

11. In a positioning mechanism embodying a lead screw and nut and means for producing relative rotation to effect a relative translation therebetween, means for compensating for errors in said lead screw comprising a rotary cam mounted on said lead screw provided with a contour representing progressively the substantially like departures from the operation of a true thread periodically recurring in each revolution of said lead screw, a cam follower, and an indicator means associated with said lead screw and connected to derive its position from said cam follower whereby an appropriate variable correction factor is applied continuously to said indicator means.

12. In a positioning mechanism embodying a lead screw and nut and means for producing relative rotation to effect a relative translation therebetween, means for compensating for errors in said lead screw comprising a rotary cam provided with a contour representing progressively the substantially like departures from the operation of a true thread periodically recurring in each revolution of the lead screw thread, means for rotating said cam at an angular speed corresponding to the relative rotation between said nut and screw, a second cam means connected to be operated in timed relation with said relative rotation, said second cam means having a contour representing progressively the non-periodic departures from a true thread occurring irregularly along the length of said lead screw, an adjustably mounted element connected to each of said cam means for deriving its position progressively from the combined effects thereof, an indicator means associated with said means for effecting relative translation, and a connection from said element for applying a variable adjustment to said indicator means correcting for errors in said lead screw.

13. In a positioning device embodying a lead screw and a cooperating nut and means for producing relative rotation between said nut and screw, mechanism for compensating for errors in said lead screw comprising a cam means connected to be operated in timed relation with said relative rotation, said cam means being formed to represent progressively departures from an accurate thread along said lead screw, a cam follower, an indicator means associated with said lead screw and nut, a connection from said cam follower for adjusting said indicator means to compensate for said errors, and means in said connection adjustable to compensate for the effect of changes in temperature.

ROBERT SIDNEY SHREWSBURY.

REFERENCES CITED

The following references are of record in the file of this patent:

UNITED STATES PATENTS

| Number | Name | Date |
| --- | --- | --- |
| 1,508,875 | Davis | Sept. 16, 1924 |
| 1,879,294 | Jones et al. | Sept. 27, 1932 |

FOREIGN PATENTS

| Number | Country | Date |
| --- | --- | --- |
| 408,394 | Great Britain | Apr. 12, 1934 |